United States Patent
Sri-Jayantha et al.

[11] Patent Number: 5,818,657
[45] Date of Patent: Oct. 6, 1998

[54] DISK DRIVE WITH IMPULSE TORQUE GENERATING ELEMENT

[75] Inventors: Sri Muthuthamby Sri-Jayantha; Vijayeshwar Das Khanna, both of Ossining; Suresh Kumar, Croton-on-Hudson, all of N.Y.; Mutsuro Ohta; Kohji Serizawa, both of Kanagawa, Japan

[73] Assignee: International Buisness Machines Corporation, Armonk, N.Y.

[21] Appl. No.: 690,698

[22] Filed: Jul. 31, 1996

Related U.S. Application Data

[60] Provisional application No. 60/003,831 Sep. 15, 1995.

[51] Int. Cl.[6] .................................................. G11B 15/46
[52] U.S. Cl. ..................................... 360/73.03; 360/73.02
[58] Field of Search .................................. 360/69, 73.03, 360/75, 73.02, 71, 103

[56] References Cited

U.S. PATENT DOCUMENTS

| | | | |
|---|---|---|---|
| 3,855,622 | 12/1974 | Truscelli et al. | 360/103 |
| 4,530,021 | 7/1985 | Cameron | 360/75 |
| 5,018,029 | 5/1991 | Ekhoff et al. | 360/69 |

*Primary Examiner*—Tan Dinh
*Attorney, Agent, or Firm*—Heslin & Rothenberg, P.C.

[57] ABSTRACT

A method and system for overcoming force which inhibits movement of a data storage device are provided. The invention includes generating momentum in a moveable member and then utilizing the momentum of the moveable member to generate a large impulse force on a stationary body (e.g., the data storage device) to overcome the movement-inhibiting force thereon. This is accomplished by allowing the moveable member to move along a trajectory independently of the stationary body, thereby building momentum in the moveable member. The subsequent impact of the member on the body overcomes the force. The moveable member can then also be used, in one embodiment, to continue driving the body during system operation.

24 Claims, 5 Drawing Sheets

DISK DRIVE WITH IMPULSE TORQUE GENERATING ELEMENT

RELATED APPLICATION INFORMATION

This application claims the benefit of U.S. Provisional Application Ser. No. 60/003,831, entitled "Disk Drive With Impulse Torque Generating Element," filed Sep. 15, 1995. This Provisional Application is hereby incorporated by reference herein in its entirety.

TECHNICAL FIELD

This invention relates to data storage systems. More particularly, this invention relates to a method and system for overcoming forces which inhibit initial movement of a moveable data storage device in a data storage system.

BACKGROUND OF THE INVENTION

Direct access storage devices (DASD) often employ the contact start stop (CSS) method to park the sliders thereof during power off mode. The sliders under appropriate conditions can become attached to the disk surface, and may cause larger than expected stiction force, i.e., a force which tends to inhibit movement of the disk. For a 2.5" disk drive with 4-sliders, the average stiction torque is about 100 g.cm, and a spindle motor can typically produce a static torque of only 80 g.cm. A conventional spindle motor using the known "vibration method" of overcoming stiction can produce sufficient starting torque to overcome the average stiction torque. But any significant increase in stiction torque can prevent a DASD from spin up, thereby rendering the DASD unusable.

FIGS. 1a and 1b are sectional views of a typical moving shaft spindle data storage system 10. A conventional spindle system has a fixed magnetic core or stator 16 that is attached to the baseplate 18, a shaft 20, and moving magnets 14a,b that are affixed to the spindle hub 12 of the data storage device (i.e., disk). The circular disk is not shown, for clarity. Electromagnetic forces developed in the stator 16 induce motion of the magnets 14 fixed on the spindle hub 12 and therefore cause the storage device as a whole to spin for operation of the system.

Consider a 2.5" 4-slider DASD. The stiction torque for a population of DASDs can be as high as 250 g.cm and the conventional spindle motor cannot overcome stiction torque above 100 g.cm. The problem becomes worse for disk drives with many platters and sliders.

What is required, therefore, is a method and system for overcoming stiction forces in a data storage system which tend to inhibit initial movement of the data storage device (e.g., disk).

SUMMARY OF THE INVENTION

The shortcomings of the conventional techniques are overcome by the present invention which in one aspect is a method for overcoming force which inhibits movement of a data storage device in a data storage system. The method includes providing a moveable member in operative relationship with the data storage device, moving the moveable member along a forward trajectory to build momentum therein, and overcoming the force, including impacting the data storage device with the moveable member following its movement along the forward trajectory.

Contact between the moveable member and the data storage device can be maintained, such that the moveable member, driven by a drive mechanism, drives the data storage device during subsequent operation of the data storage system. A magnetic force may be applied between the moveable member and the data storage device to maintain this contact.

In one embodiment of the present invention, the drive mechanism comprises a stationary stator, the data storage device comprises a circular disk, and the moveable member comprises a ring positioned concentric with the stator and a spindle hub of the disk. In this embodiment, the forward trajectory is a rotational trajectory of the ring. Movement of the ring is induced by using the stator.

Prior to moving the moveable member along the forward trajectory, the member may be moved along a reverse trajectory thereby increasing distance along the forward trajectory the member is moved to build the momentum therein.

In another aspect the invention, a data storage system is provided including a moveable data storage device having a contact area, and a moveable member mounted in operative relationship with a drive mechanism and the data storage device. The moveable member is moved by the drive mechanism along the first trajectory while movement of the data storage device is inhibited by a force thereon. Contact areas of the moveable member and the data storage device are aligned such that at the completion of the first trajectory, the contact areas of the moveable member and the data storage device impact thereby overcoming the force inhibiting the movement of the data storage device.

As discussed above, the moveable member may be a ring in which case a notch may be formed on an end thereof and the contact area of the data storage device comprises a surface of a member projecting from a spindle hub into the notch, the notch and the projecting member being aligned such that the contact areas thereof impact following rotational movement of the ring along the first trajectory. In this embodiment, valuable radial distance is conserved within the spindle hub.

These and other embodiments of the present invention overcome the movement-inhibiting forces discussed above without requiring a motor of increased size. Rather, momentum is built in the moveable member which is transferred to the data storage device during an impact, which impact overcomes the forces inhibiting movement of the data storage device.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed description of a preferred embodiment and the accompanying drawings in which:

DETAILED DESCRIPTION OF THE PREFERRED EMBODIMENT(S)

As discussed above, magnetic disk drives are exposed to stiction induced failure when contact start stop technology is used. High stiction torque encountered in a DASD is conventionally overcome by the spindle vibration method. The present invention improves upon this approach by introducing a movable element with limited angular stroke within the spindle motor hub. The conventional torque is first applied to this moving element with all other components at rest. Angular momentum of the moving element is substantially increased during this period. At the end of its stroke or trajectory, the moving element impacts a contact surface (e.g. limiters) attached to the hub, and produces an impulse torque at the hub. The impact helps overcome the stiction. Torque amplification of two orders of magnitude is possible using the method and system of the present invention.

Figure 1A:
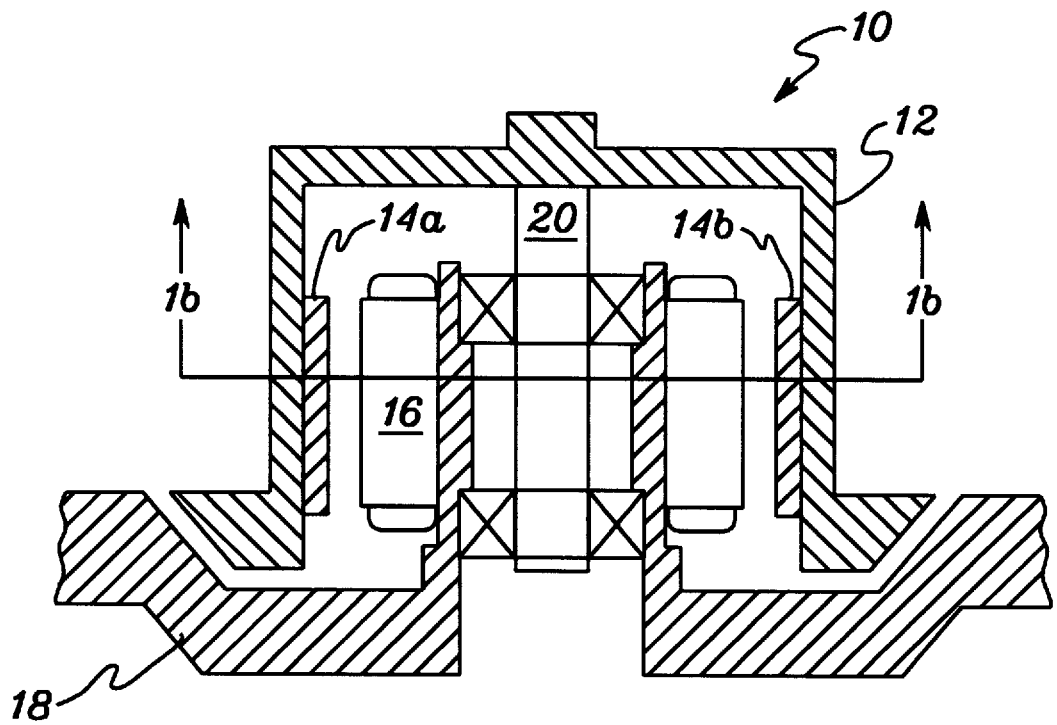
FIGS. 1a and 1b are side and top sectional views of a conventional spindle-based data storage system.
Figure 1B:
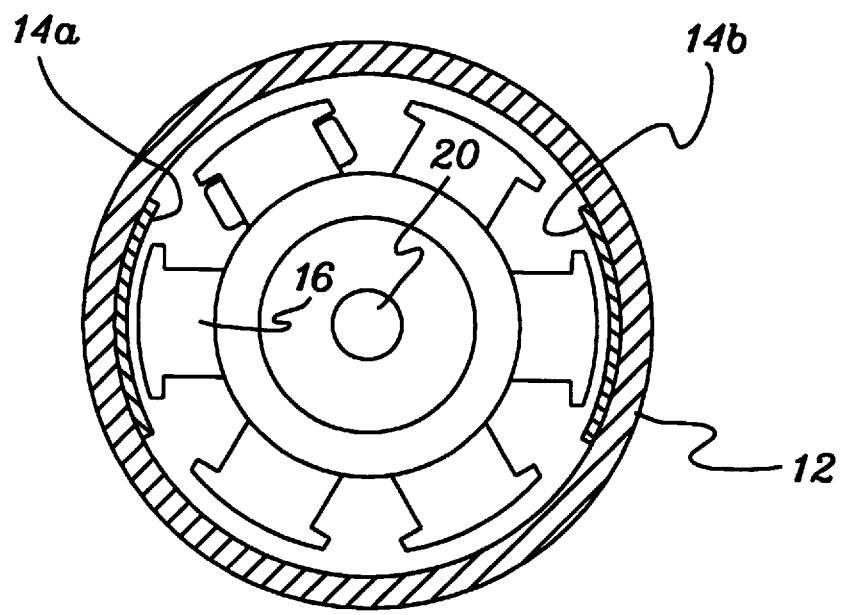
Figure 2A:
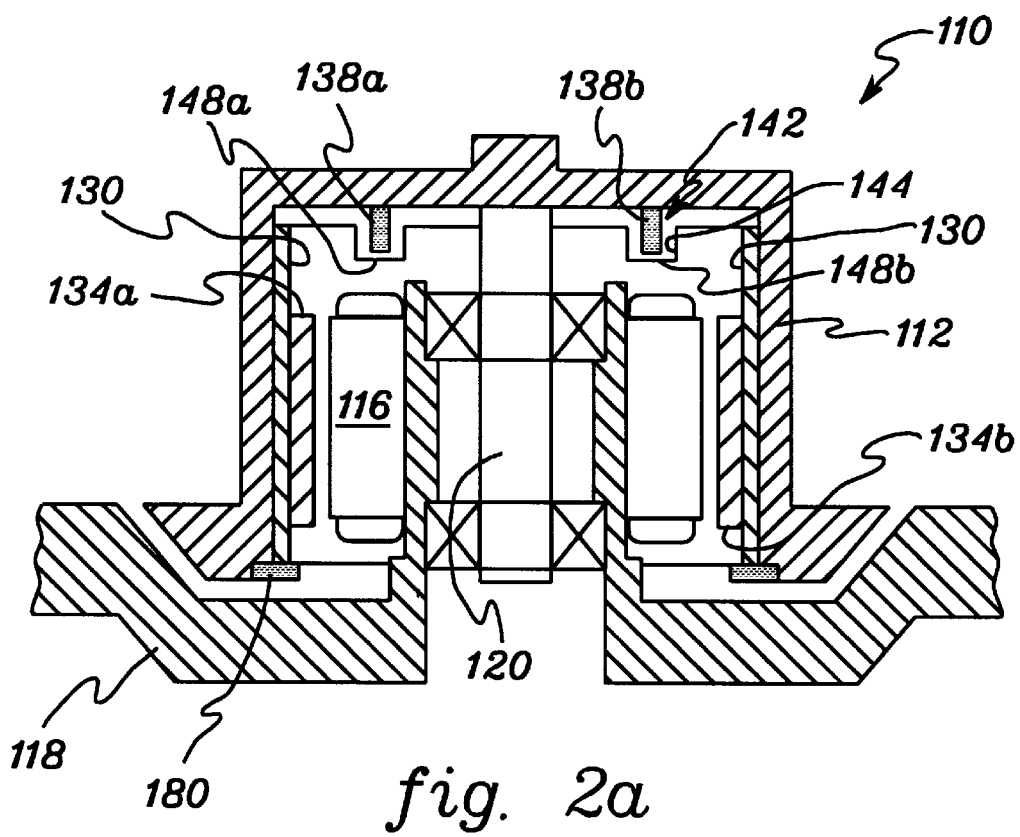
FIGS. 2a and 2b are side and top sectional views of a spindle-based data storage system including a moveable magnetic ring therein according to the principles of the present invention.
Figure 2B:
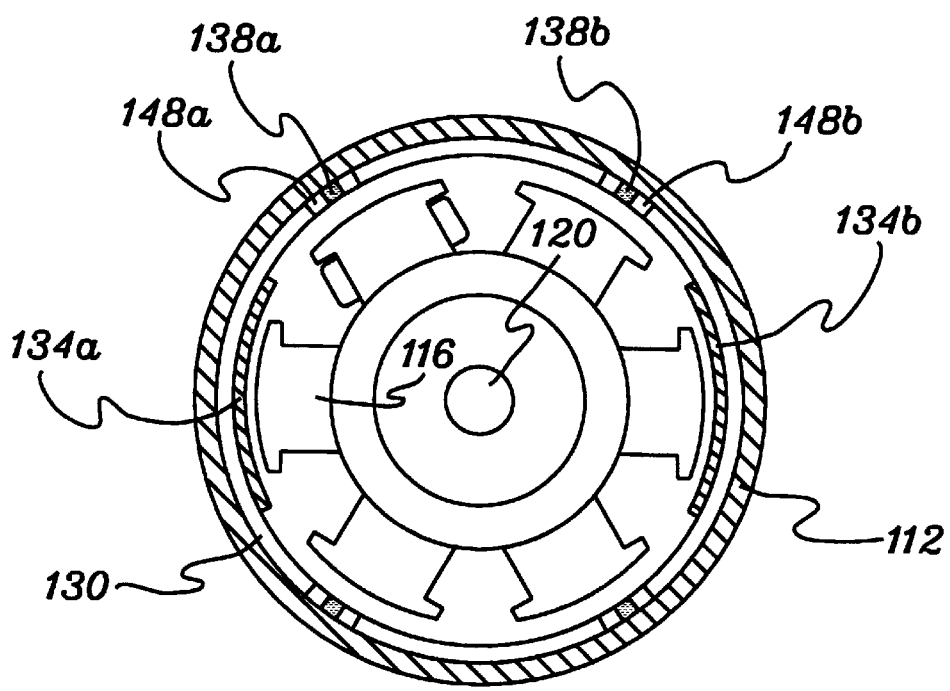

With reference to the inventive data storage system 110 depicted in FIGS. 2a and 2b, during a power on cycle, spindle torque is generated electromagnetically by applying current to the stationary coils of the stator 116 (which is attached to baseplate 118 and shaft 120). The torque generated between the stator coil and the conventional rotor magnet is used to propel the hub from rest to a steady speed in about 3 seconds. In this invention, however, a movable ring 130 of magnets 134a, 134b replaces the magnets 14 that are affixed to the hub as shown in FIG. 1. Torque amplification is achieved by first moving the magnetic ring 130 along a trajectory independent of the hub, and then causing an impact of contact surfaces of the moveable magnet ring 130 and the stationary hub 112, thereby generating impulse energy which is transferred to the hub to overcome the stiction forces thereon.

FIGS. 2a and 2b depict a particular embodiment of the ring and hub of the present invention. In this embodiment, pins 138a and 138b are attached to the hub. Notches 148a and 148b are formed in corresponding positions on an upper end of the ring 130. With particular reference to pin 138b and notch 148b, a contact surface 142 of the pin and a contact surface 144 of the notch are aligned, and impact following the rotational movement of the ring along the trajectory defined by the size of the notch. The size of the notch in this exemplary embodiment therefore defines the stroke angle, or the size of the trajectory, along which the magnetic ring moves before impacting the pins of the hub. This exemplary embodiment is advantageous in that no valuable radial distance is lost to the formation of the corresponding contact surfaces, as such lost radial distance would decrease the amount of torque transferred from the motor to the disk. FIG. 2b illustrates that 4 pins and corresponding notches are provided in this exemplary embodiment. Those skilled in the art will recognize that there are many, alternative approaches to arranging a moveable member in relationship to the stationary hub in order to cause the requisite impact to overcome the stiction forces.

Figure 3:
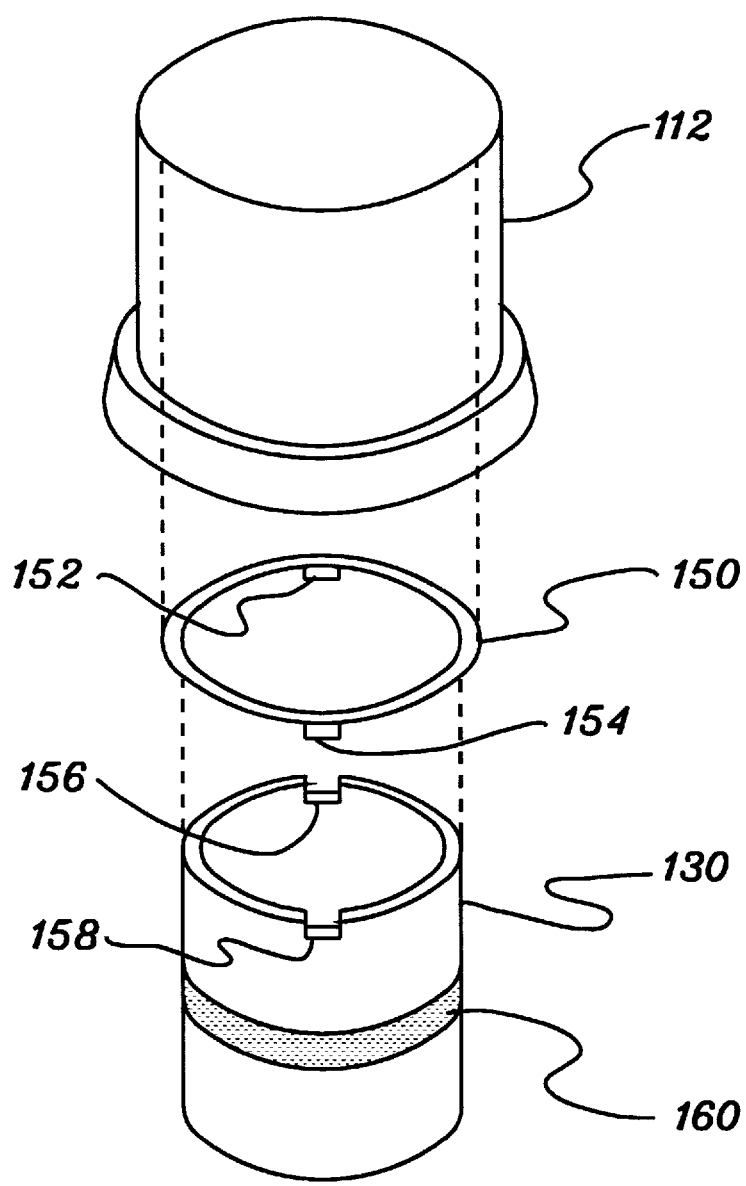
FIG. 3 is an isometric view of the arrangement of the hub, limiter and magnetic ring according to the principles of the present invention.

FIG. 3 is an isometric view of the impulse producing members for a two-pin implementation, including the hub 112 and ring 130 having notches 156, 158 formed therein. A "limiter" 150 is shown from which two corresponding pins 152 and 154 project. Because of fabrication constraints, the limiter is formed separately from the hub in this embodiment, and is affixed to the inside of the hub during system assembly. In this respect, the pins and contact surfaces thereof should be considered part of the "data storage device," including the hub and disk, as they are eventually all affixed together during assembly. The term "ring" is used broadly herein and can denote the cylindrical shaped body shown in FIG. 3.

The angular stroke length of the moving ring is a design parameter, but simple estimates show that a moving element with 4 gm.cm2 inertia needs only about 5 deg. angular stroke. When a starting torque is applied to the spindle, the initial movement is only due to that of the moving magnetic ring. Within a fraction of a second the ring will have gained sufficient angular momentum to produce the impulse torque on the hub. Once the impulse torque is applied to break up the stiction the spindle motor will continue to pick up speed and drive the ring around the hub. Thus, following impact, contact between the ring and the hub is maintained to drive the data storage device. This continuous contact may not occur instantaneously following impact (e.g. some "bounce" may occur), but nevertheless, this contact is maintained at a point in time following impact to drive the storage device as if the whole hub were made of a single part.

Figure 4:
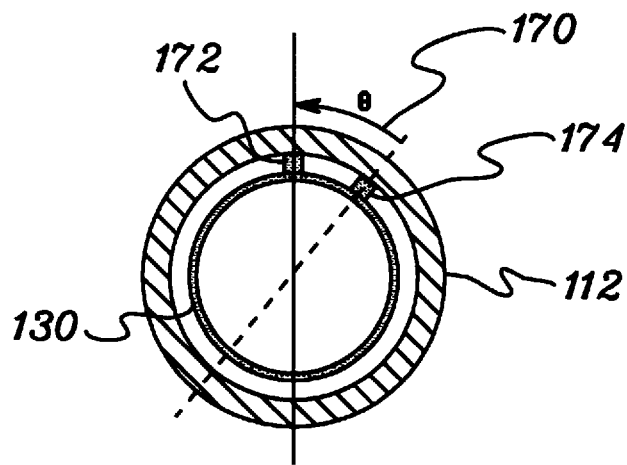
FIG. 4 is a top sectional view of a conceptual embodiment of the present invention used to illustrate the stroke angle between the contact surfaces of the hub and the ring according to the principles of the present invention.

FIG. 4 depicts a simplified, top sectional view of the magnet ring 130 and the hub 112, and shows the stroke angle θ 170 between an exemplary contact point 172 on the hub and the corresponding contact point 174 on the ring. This simplified view of FIG. 4, and the following definitions, are used below to support an analysis of the momentum and impact torque available using the present invention:

| | |
|---|---|
| $T_i$ | Impact torque |
| $T_{max}$ | Peak motor torque |
| $I_m$ | Magnet inertia |
| $I_h$ | Hub inertia |
| $I_d$ | Disk inertia |
| θ | Stroke angle |
| $t_f$ | Stroke time |
| Δt | Impact pulse width |

The mathematical relationships between these variable are as follows:

$$I_m \ll I_h + I_d$$

$$t_f = \sqrt{\frac{T_{max}\theta}{I_m}}$$

$$\text{Magnet impact velocity } \dot{\theta} = \sqrt{\frac{I_m \theta}{T_{max}}}$$

$$\text{Impact torque } T_i = \frac{2}{\Delta t} \sqrt{T_{max} I_m \theta}$$

Figure 5A:
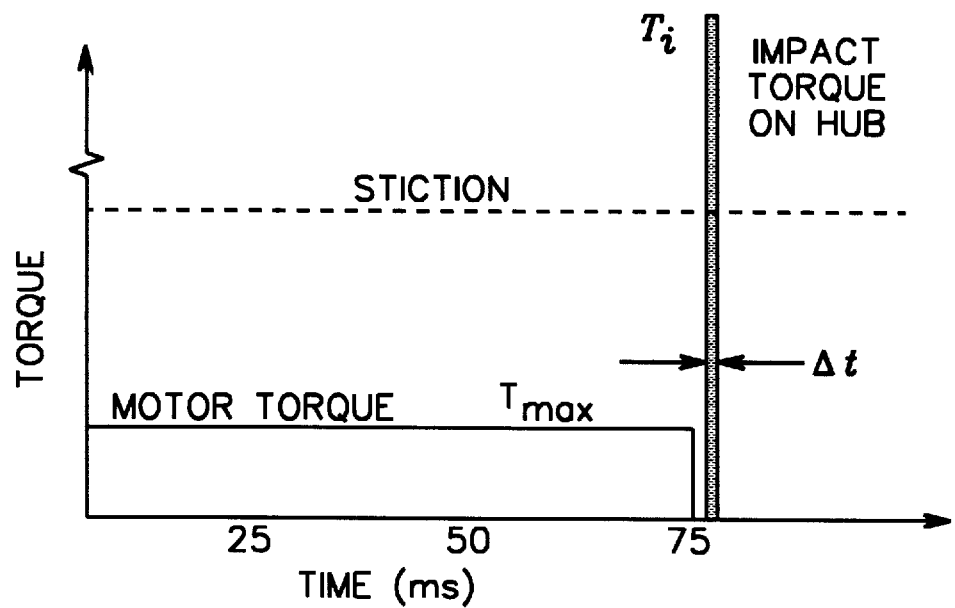
FIGS. 5a and 5b are graphs depicting the general theory of operation of the present invention, and a specific example for a 2.5" DASD, respectively.

FIG. 5a is a graph of torque vs. time during spinup, and illustrates that the stiction torque cannot be overcome by the motor torque alone. However, the stiction torque is surpassed during impact on the hub by the ring.

Figure 5B:
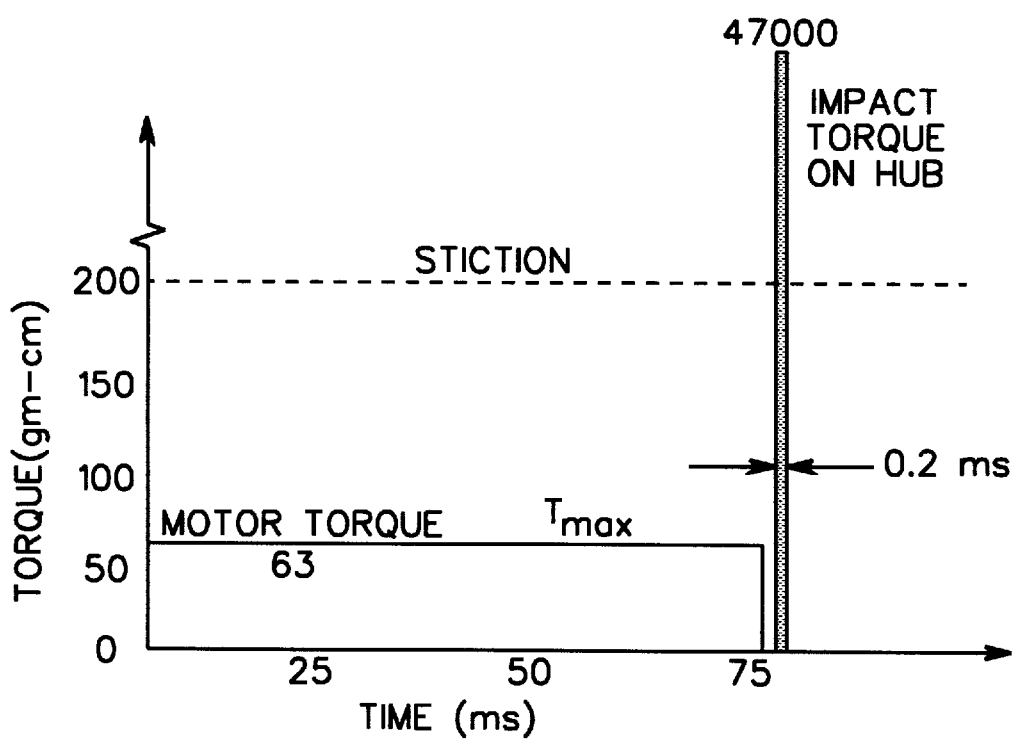

FIG. 5b shows the corresponding graph for a typical 2.5"-2-disk design, wherein:

| | | |
|---|---|---|
| $T_{max}$ | Peak motor torque = | 63 gm-cm |
| $I_m$ | Magnet inertia = | 4 gm-cm$^2$ |
| θ | Stroke angle = | 5 degrees |
| Δt | Impact pulse width = | 0.2 ms |

It can be observed that the impact torque is more than 200 times that of the stiction torque.

To ensure availability of full stroke length to the movable ring a mild reverse torque can be momentarily applied before attempting to break the stiction with the application of forward torque. Techniques similar to torque amplification may also be achieved with the movable ring design to enhance the impulse torque magnitude.

The moveable magnet ring is supported by a journal bearing technology (i.e., using journal bearing surface 160 in FIG. 3 and/or retainers 180 in FIG. 2) within the hub. It can also be supported by a suitable set of flexures or soft material that would allow angular displacement within the stroke limit envisaged in the design. During steady speed control or during power down it may be necessary to keep the movable ring and the hub as a single body. A light magnetic holding force that is less than the equivalent stiction force can be designed into the limiter.

In summary, the present invention provides a method and system for generating a momentum (for example, linear or angular) with a weak force in a moveable member and then utilizing the momentum of the moveable member to generate a large impulse force on a stationary body (i.e., data storage device) to break up stiction thereof. This is accomplished by allowing the moveable member to move along a trajectory independently of the stationary body, thereby building momentum in the moveable member. The subsequent impact of the member and the body breaks up the stiction. The moveable member can then also be used, in one embodiment, to continue driving the body during system operation. The phrase "initiating movement" is used broadly herein to denote overcoming motion inhibiting forces and/or inducing actual motion of the subject body.

The concept can also be applied to the actuator having a movable voice coil motor (VCM) relative to the arm. In this case, once the stiction break up is achieved through VCM vibration and impulse, the VCM must be held rigidly with the arm to facilitate normal seek and track-follow operation.

While the invention has been described in detail herein in accordance with certain preferred embodiments thereof, many modifications and changes therein may be affected by those skilled in the art. Accordingly, it is intended by the following claims to cover all such modifications and changes as fall within the true spirit and scope of the invention.

What is claimed is:

1. A method for initiating movement of a data storage device within a data storage system, comprising:

activating a drive mechanism to move a movable member along a forward trajectory thereby building momentum therein, said movable member being in operative relationship with said drive mechanism and including a contact surface such that the contact surface of the moveable member impacts a contact surface of the data storage device;

initiating movement of the data storage device according to said momentum built in the moveable member.

2. The method of claim 1, further including:

after said initiating movement, maintaining engagement between the contact surfaces of the data storage device and the moveable member such that the data storage device and the moveable member, driven by said drive mechanism, move together during operation of the data storage system.

3. The method of claim 2, wherein said maintaining engagement includes:

providing an attractive force between the contact surface of the data storage device and the contact surface of the moveable member to maintain said engagement of said contact surfaces during their movement together.

4. The method of claim 1, further comprising:

moving the moveable member along a reverse trajectory before moving said movable member along the forward trajectory thereby increasing a distance moved by the moveable member along the forward trajectory and increasing the momentum built in the movable member.

5. The method of claim 1, wherein said initiating movement of the data storage device includes:

initiating rotation of the data storage device.

6. The method of claim 5, wherein:

the drive mechanism comprises a stationary stator;

the data storage device comprises a storage disk, including a spindle hub; and the moveable member comprises a moveable ring positioned between the stator and the spindle hub.

7. The method of claim 6, wherein the contact surface of the moveable member comprises an edge of a notch formed on an end of the ring, and wherein the contact surface of the data storage device comprises a surface of a member projecting from the spindle hub into the notch, the notch and the projecting member being aligned such that the contact surfaces thereof impact after rotational movement of the moveable member along the forward trajectory.

8. The method of claim 7, wherein the notch is formed as a function of a desired size of the forward trajectory.

9. In a data storage system, a method for overcoming force which inhibits movement of a data storage device in the data storage system, the method comprising:

moving a moveable member in operative relationship with the data storage device along a forward trajectory to build momentum therein; and overcoming the force, including impacting the data storage device with said moveable member following its movement along said forward trajectory and according to said momentum built therein.

10. The method of claim 9, further including:

maintaining contact between the moveable member and the data storage device after said overcoming, such that the moveable member, driven by a drive mechanism, drives the data storage device during subsequent operation of the data storage system.

11. The method of claim 10, wherein said maintaining contact includes using a magnetic force between the movable member and the data storage device.

12. The method of claim 9, wherein the drive mechanism comprises a stator, the data storage device comprises a disk, the moveable member comprises a ring positioned concentric with the stator and a spindle hub of the disk, and the forward trajectory comprises a rotational trajectory of the ring.

13. The method of claim 12, wherein said moving the ring comprises electromagnetically inducing movement thereof using said stator.

14. The method of claim 9, further including:

prior to said moving the moveable member along the forward trajectory, moving the moveable member along a reverse trajectory to thereby increase a distance along the forward trajectory the moveable member is moved to build the momentum therein.

15. A data storage system, comprising:

a moveable data storage device having a contact area; and a moveable member mounted in operative relationship with a drive mechanism and the data storage device and further having a contact area, the moveable member moveable by said drive mechanism along a first trajectory while movement of the data storage device is inhibited by a force thereon, the contact area of the moveable member and the contact area of the data storage device being aligned such that at the completion of the first trajectory the contact area of the moveable member and the contact area of the data storage device impact thereby overcoming the force inhibiting the movement of the data storage device.

16. The data storage system of claim 15, wherein:

the data storage device comprises a disk having a spindle hub, the spindle hub having the contact area; and the moveable member comprises a ring positioned concentric with the spindle hub.

17. The data storage system of claim 16, wherein the contact area of the moveable member comprises a surface of a notch formed on an end of the ring, and wherein the contact area of the data storage device comprises a surface of a member projecting from the spindle hub into the notch, the notch and the projecting member being aligned such that the contact areas thereof impact following rotational movement of the ring along the first trajectory.

18. The data storage system of claim 17, wherein the notch is formed as a function of a desired size of the first trajectory.

19. The data storage system of claim 16, wherein the drive mechanism comprises a stationary stator positioned concentric with the ring and for electromagnetically driving the ring.

20. The data storage system of claim 15, wherein the moveable member builds momentum during its movement along the first trajectory and the momentum is transferred to said data storage device during said impact.

21. The data storage system of claim 15, wherein, after said impact, the contact area of the moveable member and the contact area of the data storage device maintain contact with each other such that the drive mechanism and the moveable member together maintain motion of the data storage device for operation of the data storage system.

22. The data storage system of claim 15, further comprising:

an attractive force between the contact area of the data storage device and the contact area of the moveable member following impact thereof.

23. The data storage system of claim 22, wherein the attractive force comprises magnetism.

24. The data storage system of claim 15, further comprising:

means for moving the moveable member along a second opposite trajectory to increase the size of the first trajectory.

* * * * *

UNITED STATES PATENT AND TRADEMARK OFFICE
CERTIFICATE OF CORRECTION

PATENT NO. : 5,818,657
DATED : October 6, 1998
INVENTOR(S) : Sri-Jayantha et al.

It is certified that error appears in the above-identified patent and that said Letters Patent is hereby corrected as shown below:

Item [73] Assignee: Delete "Buisness" and replace with --Business--.

Signed and Sealed this

Twenty-third Day of March, 1999

Attest:

Q. TODD DICKINSON

Attesting Officer

Acting Commissioner of Patents and Trademarks